June 6, 1950     W. F. WALDECK     2,510,355
MANUFACTURE OF CARBOXYMETHYLCELLULOSE
Filed Nov. 20, 1947
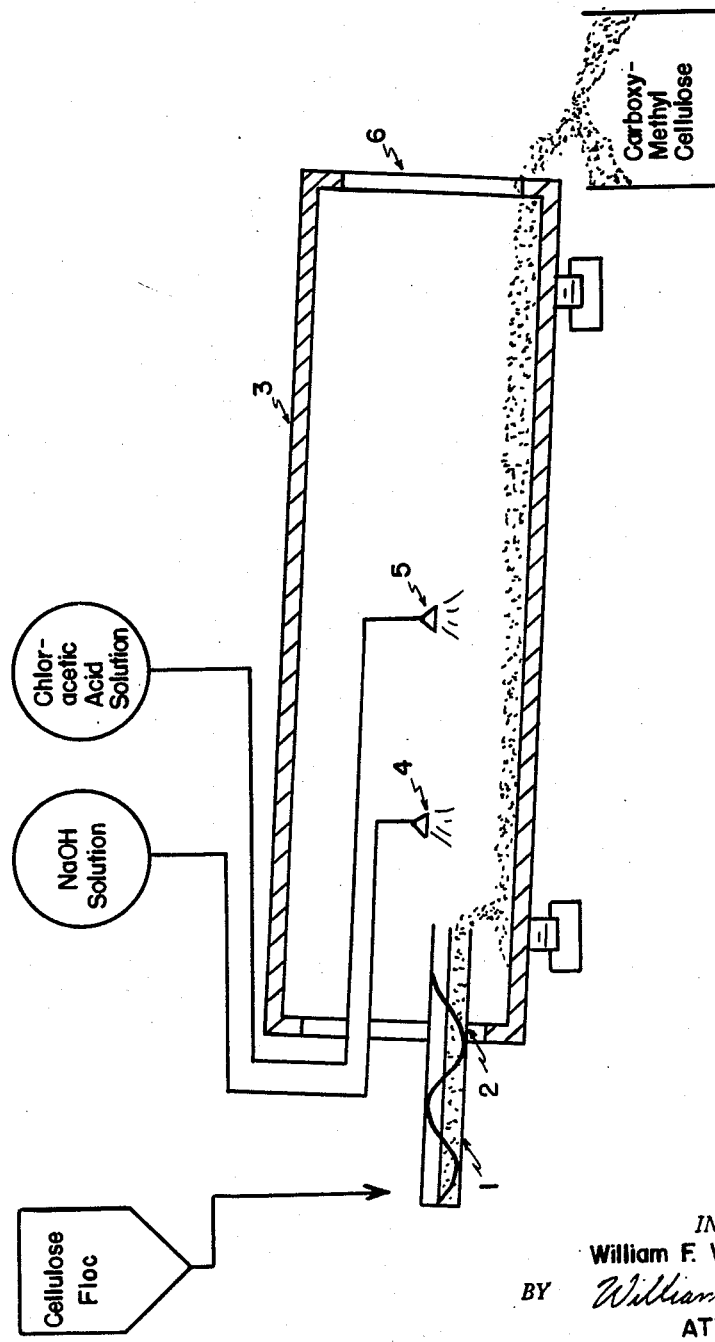
INVENTOR.
William F. Waldeck
BY *William R. Day*
ATTORNEY Patented June 6, 1950

2,510,355

UNITED STATES PATENT OFFICE 2,510,355

MANUFACTURE OF CARBOXYMETHYL-CELLULOSE

William F. Waldeck, Grosse Ile, Mich., assignor to Wyandotte Chemicals Corporation, Wyandotte, Mich., a corporation of Michigan Application November 20, 1947, Serial No. 787,243

6 Claims. (Cl. 260—231)

The present invention relates to a process for the manufacture of a cellulose ether, more popularly and currently referred to as "carboxymethylcellulose." Such a cellulose ether has been technically referred to, in both the prior published literature and in prior patents, as cellulose glycollic acid, or, as in the case of its water-soluble sodium salt, as sodium cellulose glycollate. Sodium cellulose glycollate or sodium carboxymethylcellulose is a chemical compound of outstanding commercial importance and utility. It has many fields of use and commercial adaptation, such as its incorporation in drilling muds, its use as a thickening and dispersing agent in the manufacture of cosmetics, paints, its use as a food additive, its incorporation in soaps and detergents as a detersive action accelerator, etc.

Hence there has been an outstanding and increasing demand for carboxymethylcellulose. Due to the relatively high cost and the relatively lengthy process heretofore required in the manufacture of this product, such commercial demand for it has not been satisfied. It is the general object and nature of my invention to provide a process for the manufacture of carboxymethylcellulose, or sodium cellulose glycollate, wherein the processing time is reduced to but a fraction of that heretofore required; the process reaction rendered highly efficient in that the amount of unreacted material in the final product is substantially equal to that found present in a steeping process product; the degree of substitution of the cellulose ether rendered an unusually high proportion of the theoretical degree of substitution; wherein comparatively inexpensive and low-cost-operation equipment is required; and finally a process which is readily adapted to continuous operation.

Previously disclosed processes for the manufacture of carboxymethylcellulose required the steeping of the cellulose starting material in a liquid reactant. For example, in British Patent 138,116, it is required that cellulose first be transformed to the form of soda cellulose, and then, after removal or pressing out of excess caustic soda, etherified either with monochloracetic acid or sodium chloracetate. In U. S. Patent 2,131,733 cellulose in sheet form is steeped in a sodium chloracetate solution, excess solution pressed out of the sheets and the latter then subjected to treatment with caustic soda. In U. S. Patent 2,278,612 a continuous sheet of cotton linters is first treated in a bath of chloracetic acid, excess acid pressed out of the sheet, the latter then passed through a caustic soda bath and the so-treated sheet finally shredded and permitted to age for several hours in order to effect the etherification reaction. In all of these prior art processes, relatively expensive steeping presses, reaction process vessels and other equipment has been required. The reaction times have all been unusually prolonged, such as for example, at least 38 hours process time as required by the process of British Patent 138,116 and 23 hours as required by the process of U. S. Patent 2,131,733.

Even though prior contributors to the art have attempted to employ cellulose in various physical forms, such as the sheet form of the prior art hereinabove mentioned, the chipped cellulose sheets or "granulated" cellulose of $1/16$ inch to $1/2$ inch particle size of U. S. Patent 2,067,946, and even the cellulose in "fluffed condition" (see p. 1, col. 1, ll. 36–41 of U. S. Patent 2, 067,946); the obstacles of high cost of operation and equipment and prolonged reaction time, have not been overcome According to the process embodying the principle of my invention, a rapid and highly efficient etherification reaction is obtained. Steeping of the cellulose with liquid reactants, involving the use of expensive equipment and machinery, is eliminated; as well as the necessity for handling relatively large quantities of excess liquid reactants. The process of my invention effects a thorough and complete etherification reaction in a period of 3 to 8 hours which is on the order of three to eight times faster than that heretofore obtainable. In addition the degree of substitution of the glycollic acid or sodium glycollate radical in the cellulose ether is of a high order. Thus, an efficient and thorough reaction is not sacrificed for the sake of speed. The process of my invention can be carried out in relatively inexpensive, light-weight equipment. And finally, my process is readily adapted to a continuous operation.

Briefly outlined, the process of my invention involves, first of all, the utilization of a milled comminuted cellulose (termed "cellulose floc" in the trade) having a particle size finer than 40 mesh screen size i. e., capable of passing through a 40 mesh screen, and a bulk density of at least 5 pounds per cubic foot. Such milled cellulose, with the liquid reactants — caustic soda solution and chloracetic acid (or sodium chloracetate) solution — added, is subjected to a mechanical mixing action until the entire chemical reaction is complete. These liquid reactants are preferably added in sequence, but the order of their addition is immaterial, i. e. the caustic soda may be added first, followed by the acid or vice versa. During the entire mixing and reaction stages of the process, the comminuted cellulose and added reactants are agitated in a simple form of mechanical agitator, such as a rotary tumbling drum, which imparts a tumbling action to the material, or an equivalent form of solid material mixing apparatus such as a dough-mixer, or a sigma arm mixer. The mixing of the cellulose and other reactants, as well as the etherification reaction can be accomplished entirely within the mixing vessel as the sole required equipment.

It has been found that the particle size limitation of the milled cellulose capable of successful operation in my process, is quite well defined. When cellulose is contacted with caustic alkali solution, there is a tendency for the cellulose fibres or particles to swell and prevent the penetration of addition liquid reactant to the interior of the cellulose body, thus inhibiting further reaction. This condition exists particularly in the case of cellulose in sheet form, and even in the case of "granulated cellulose" which is a chopped cellulose sheet, and can therefore be regarded as a coarse particle size of milled cellulose; i. e., larger than 16 mesh screen size. Likewise, "cellulose fluff," consisting of unground fibres in a fluffed condition of extremely light bulk density (1 to 2 lbs./cu. ft.) will pack or ball up when wet with liquid reactant and subjected to a mixing action.

In prior processes, the use of excess amounts of liquid reactants, such as caustic soda, has undoubtedly been necessitated by the above described swelling action of cellulose agglomerates; whereas in my process the individual, discrete particles of cellulose are of such size as to be capable of being thoroughly wettable and reactable with such liquid reactants throughout the cellulose mass; so that only the chemically equivalent amount of caustic soda, for example, need be used in my process.

I have thus established that the particle size range for the milled cellulose employed in my process is limited by the maximum particle size of 40 mesh screen size. This maximum particle size limitation is critical.

Although my process may be carried out with sodium chloracetate solution as a previously prepared reactant, it is preferable to effect the formation of sodium chloracetate in situ or within the reaction mass, which is alternatively accomplished by (1) spraying dilute chloracetic acid onto the cellulose and NaOH reaction mixture, (2) adding dry, solid sodium carbonate (such as "light soda ash") to the cellulose and then spraying chloracetic acid solution onto the mixture, or (3) by reversing this order of addition and first spraying on the chloracetic acid solution followed by the addition of the dry, solid sodium carbonate.

My process also possesses the advantage of utilization of relatively high strength or high concentrations of reactant solutions, thereby eliminating the necessity for the handling and extraction of excess water. It has been found that preferably, caustic soda solution of approximately 50% strength and chloracetic solutions of at least 50% strength are to be employed. Chloracetic acid solutions on the order of 80% concentration operate quite well in my process.

The annexed drawing is a diagrammatic illustration of the process of my invention wherein it is adapted for a continuous operation. The following examples will serve to illustrate in detail the precise manner in which my process can be practiced.

COMPARATIVE EXAMPLE

For the purpose of more fully illustrating the unusually high degree of efficiency of the instant process, sodium carboxymethylcellulose was made in the following manner according to Example 1 of U. S. Patent No. 2,131,733:

Wood cellulose in sheet form ("St. Regis Rauma Bleached" sulfite pulp) in the amount of 500 grams was steeped for 2 hours in a solution of sodium monochloracetate made from 1125 grams of monochloracetic acid, 1000 grams of sodium bicarbonate and 2125 grams of distilled water. The strength of the chloracetic acid solution was thus approximately 34% by weight, and the resultant sodium chloracetate solution calculated to be about 37%. After steeping, the cellulose was pressed, removing excess solution, to a weight of 1375 grams. The pressed cellulose sheet was then placed in a shredder and disintegrated for 1 hour. Caustic soda (44% NaOH) solution prepared by mixing 331 grams of anhydrous NaOH in 419 grams of distilled water were then added to the shredded cellulose and the mixture subjected to the action of the shredder for a continued period of 20 hours. The resultant product was placed in an oven at 80° C. for an hour and a half in order to effect adequate drying.

The foregoing quantities of ingredients in grams correspond mathematically to the amounts given in parts by weight in Example 1 of U. S. Patent No. 2,131,733.

On analysis the resultant sodium carboxymethylcellulose product of this last described process was found to contain 6.7%[1] by weight of insolubles (dry basis) and a 0.2 degree of substitution. This degree of substitution was thus approximately 20% of the theoretical 1.0 degree of substitution or "1 mol of alkylating agent per glucose unit of the cellulose," of the aforesaid patent process.

The last above analytical results were obtained according to the following procedures:

WATER INSOLUBLES CONTENT
ANALYTICAL PROCEDURE

Weigh 5.000 grams of sodium carboxymethylcellulose, as received, into a 600 ml. beaker, add approximately 400 ml. of water. Heat to near boiling (80–95° C.), while stirring with electric stirrer until sodium carboxymethylcellulose is completely dispersed, and all soluble material is in solution (usually two hours stirring is adequate), cool, transfer to a 500 ml. volumetric flask, washing beaker with distilled water, make up to mark with distilled water, mix thoroughly and let stand overnight or until insoluble material has settled to bottom of flask and supernatant liquor is clear. Pipette 50 ml. clear liquid into tared covered weighing bottle. Remove cover, evaporate water on steam bath, place in oven and dry at 110° C. to constant weight, replace cover while in oven, remove, cool in desiccator and weigh.

$$\% \text{ Insolubles (dry basis)} = \frac{(W-M-10S) \times 100}{W \times (100\% - \%H_2O)}$$

W=Weight of sodium carboxymethylcellulose
M=Grams of moisture
S=Weight of material dissolved in 50 ml.

DEGREE OF SUBSTITUTION
ANALYTICAL PROCEDURE

Weigh 2.000–3.000 grams of sodium carboxymethylcellulose into a 250 ml. wide-mouth Erlenmeyer flask, add 50 cc. of nitric acid-methanol solution (100 ml. 70% HNO3 to 1 liter anhydrous methanol), stopper and shake for 3 hours. Filter through tared filtered glass crucible, (Ace grade A or other of similar porosity), or gooch with thin asbestos mat. Transfer sodium carboxymethylcellulose quantitatively to filter and remove acid by suction. Wash with 200 ml. 70% methanol,

---

[1] Average of duplicate determinations.

without letting filter pad become dry. (Methanol can be placed in a separatory funnel which is attached to crucible with bored rubber stopper with a tight seal, and stopcock can be adjusted so that methanol drips steadily through the filter.)

When all the methanol has been added, remove the excess with suction, add 20 cc. 70% methanol and again suck dry. Test this filtrate for neutrality with methyl red indicator. If acid continue washing until neutral, and remove wash liquid with suction. Wash 3 times with anhydrous methanol, remove methanol with suction, dry in oven at 100° C., cool in desiccator.

Transfer quantitatively to a 500 ml. Erlenmeyer, moisten sodium carboxymethylcellulose with 15 ml. 70% methanol then add 200 ml. distilled water and 50 ml. of .5 N standardized NaOH solution accurately measured from a buret. Stopper and shake for 3 to 5 hours. Titrate with 0.5 N HCl using phenolphthalein as indicator.

$$\frac{(ml.\ NaOH \times N) - (ml.\ HCl \times N)}{wt.\ of\ sodium\ carboxmethylcellulose} = A$$

$$\frac{.162A}{1-0.058A} = \text{Degree of substitution}$$

Example 1

A comminuted or milled wood cellulose, commercially available under the trade name of "BW-40 Solka Floc" having a particle size of 40-300 mesh, and a bulk density of 7.0824 pounds per cubic foot, was charged into a 21 inch diameter, 12 inch length, rotary tumbling drum, and in the amount of 1400 grams. A typical screen analysis of this milled or comminuted cellulose is as follows:

| Screen Mesh Size (U. S. Standard Screen) | Per Cent Retained |
|---|---|
| 40 | 0.4 |
| 60 | 14.2 |
| 80 | 22.6 |
| 100 | 8.0 |
| 200 | 25.0 |
| Thru 200, —29.8% | 29.8 |
| Total | 100.0 |

It will be seen that the major portion (54.8%) of the above analysed cellulose is finer than 100 mesh screen size.

After the above described comminuted cellulose was charged to the tumbling drum, 48.8% concentration monochloracetic acid solution in the amount of 1770 grams was then sprayed into the drum over a period of 16 minutes and onto the dry cellulose. This amount of monochloracetic acid corresponds to 1.07 mols per mol of glucose unit of the cellulose. The tumbling was then continued for 1 hour, whereupon 480 grams of anhydrous sodium carbonate (stoichiometrically equivalent to chloracetic acid present) in the form of "light soda ash" was added over a 10 minute period. This mixture was continued to be tumbled for a period of 1 and ½ hours. Caustic soda solution having a strength or concentration of 50% by weight NaOH, and in the amount of 1001 grams was sprayed onto the tumbled mixture over a period of 56 minutes.

Sodium bicarbonate in the amount of 510 grams, sufficient to neutralize the excess caustic soda, were added to the reaction mixture 1 hour and 34 minutes after the completion of the spraying in of the caustic soda. The tumbling action was continued for an additional period of 2 hours. After drying the carboxymethylcellulose product in an oven, 3050 grams were obtained. This represented 65.5% yield of dried carboxymethylcellulose product based upon the weight of total starting materials (including water) employed in the process. The total process time was 7 hours and 26 minutes.

Upon analysis, the carboxymethylcellulose product was found to contain 8.4% by weight of insoluble material and a 0.72 degree of substitution. The theoretical degree of substitution based upon the total amount of chloracetic acid employed in the process per mol of glucose unit in the cellulose, was 1.07. Thus the degree of substitution actually obtained was 67% of the theoretically obtainable degree of substitution.

Example 2

Thirty pounds of the same comminuted cellulose as employed in Example 1, and 10.5 pounds of light soda ash were charged into a rotating drum having a diameter of 4 feet and driven at a speed of 16 R. P. M. This mixture was tumbled for a 1 hour period. Monochloracetic acid solution of 48.8% concentration, in the amount of 38.2 pounds and stoichiometrically equivalent to the sodium carbonate present, was then sprayed into the rotating drum over a period of 25 minutes. The cellulose-sodium monochloracetate mixture was continued to be tumbled for 1 hour whereupon caustic soda of 46.8% concentration and in the amount of 18.6 pounds was sprayed onto the reaction mixture. The spraying of the caustic soda occurred over a period of 20 minutes. After the caustic soda addition the tumbling was then continued for a one-half hour period and the carboxymethylcellulose discharged from the tumbling drum. The total process time was 3 hours and 15 minutes.

The product was then dried in the drying oven at a temperature of 86.5° F. (30° C.).

Two additional batch runs following the above-described procedure of this example were made and the carboxymethylcellulose products of all three runs were admixed or blended together in Upon analysis this composite mixture was found to contain 11.9% insolubles, and a 0.8 degree of substitution. This represented 75% of the theoretically obtainable degree of substitution.

Example 3

The same comminuted cellulose as employed in Examples 1 and 2 above, in the amount of 1260 grams, was charged in the same 21" diameter tumbling drum as that employed in Example 1. Caustic soda solution of 27% concentration, and in the amount of 1800 grams was sprayed onto the tumbled cellulose over a period of ½ hour. The tumbling was continued for a period of 2 and ½ hours, whereupon 1026 grams of sodium chloracetate of 94.5% concentration were sprayed in. The tumbling, including time for the addition of the sodium chloracetate solution, was continued for another 2 hours, at which time 459 grams of sodium bicarbonate, in dry form, was added. There was a continued and final tumbling period of 2 hours; the total process time being 7 hours. The reaction product from the tumbling drum was oven dried at a temperature at 65° C., and resulted in a product, which upon analysis was equivalent to that of Example 1.

The processes of Examples 1-3, and the subsequently described continuous process, are equally well operable on finer grades of milled cellulose flock, of which the following screen analyses are exemplary:

| Screen Mesh Size (U. S. Standard Screen) | Percent Retained "BW-100" | Percent Retained "BW-200" |
|---|---|---|
| 100 | 11.0 | 0.5 |
| 150 | 16.5 | 5.5 |
| 200 | 13.0 | 12.5 |
| 325 | 12.5 | 36.0 |
| Thru 325 | 47.0 | 45.5 |
| Total | 100.0 | 100.0 |

It will be seen that in both of the foregoing screen analyses that the majority of the cellulose is of such particle size as to be finer than 100 mesh, viz: 89% and 99.5%. respectively.

CONTINUOUS PROCESS

The above Examples 1–3 relate to a batch-type of process for the practice of my invention. However, the process is conveniently adapted to a form of continuous operation, diagrammatic illustration of which is shown in the drawing. In such drawing it will be seen that the comminuted cellulose of the −40 mesh particle size is fed to screw conveyor 1, which in turn discharges into the feed end 2 of the elongated, rotary reaction drum 3. The speed of the rotation, and angle of inclination, of the drum 3 and its length are such as to obtain a travel of the cellulose material (viz. in both its unreacted and reacted form, as applied to a given quantity thereof) from one end of the drum to the other over a period of approximately 3–5 hours.

Caustic soda solution of approximately 50% concentration is then sprayed from the spray head 4 near the feed end 2 of the drum 3. Monochloracetic acid solution of approximately 80% concentration is next sprayed onto the reaction mixture from the spray head 5 which is located at approximately the mid-point of the length of the drum 3.

The carboxymethylcellulose product is then continuously discharged from the open discharge end 6 of the drum 3. This product is entirely suitable for use in its moist condition as so discharged, and in some cases (such as when making up with solutions) is to be preferred to the dehydrated form. However, in order to obtain the latter form of product, the undried product may be transferred directly from the discharge end 6 to a separate drying apparatus (not shown) such as a drying oven or a flash dryer.

A representative product (flash dried) from the last described continuous process was found on analysis to have an average insolubles content of 5.5% dry basis, on samples taken from several thousand pounds of production. The degree of substitution was found to range from 0.6 and above, which represented at least 50% of that theoretically obtainable, the rate of delivery of starting material and reactants being so controlled as to be on the basis of a 1.2 theoretical degree of substitution.

Other modes of applying the principle of my invention, in addition to the one hereinabove described and illustrated in detail, may be employed, provided the elements stated by any of the following claims or the equivalent of such elements be utilized.

I, therefore, particularly point out and distinctly claim as my invention and discovery:

1. The process of making carboxymethylcellulose wherein cellulose is reacted with caustic soda and sodium chloracetate formed in situ from chloracetic acid and sodium carbonate, the improvement which comprises the steps of subjecting to a tumbling action a mass of comminuted cellulose having a particle size finer than 40 mesh screen size, the major portion being capable of passing through a 100 mesh screen, and having a bulk density of at least 5 pounds per cubic foot, while spraying onto the tumbling mass an aqueous solution of caustic soda.

2. The process of making carboxymethylcellulose wherein cellulose is reacted with caustic soda and sodium chloracetate formed in situ from chloracetic acid and sodium carbonate, the improvement which comprises the steps of tumbling comminuted cellulose having a particle size capable of passing through a 40 mesh screen, and a bulk density of at least 5 pounds per cubic foot, spraying onto the tumbling mass an aqueous solution of caustic soda of approximately 50% concentration, adding sufficient sodium bicarbonate to neutralize the excess caustic soda after spraying of the latter is completed, and continuing such tumbling action after such addition.

3. A continuous process for making carboxymethylcellulose which comprises continuously agitating a mass of cellulose in such a manner as to impart tumbling action to it, and simultaneously moving such mass in a lateral direction of travel with respect to such tumbling action; said cellulose having a particle size capable of passing through a 40 mesh screen, the major portion being finer than 100 mesh size, and a bulk density of at least 5 pounds per cubic foot; and spraying caustic soda solution and a chloracetic etherifying agent solution onto such mass during the tumbling and lateral travel movement of the latter, whereby carboxymethylcellulose is delivered at the terminal end of such movement.

4. The process as in claim 3, wherein the caustic soda and etherifying agent solutions are of at least 50% by weight concentrations.

5. The process as in claim 3, wherein the time of agitation and travel of such cellulose mass, in both unreacted and reacted condition, is in the range of 3 to 5 hours.

6. In the process of making carboxymethylcellulose wherein cellulose is reacted with caustic alkali and an etherifying agent containing the chloracetate radical, the improvement which comprises subjecting to a mechanical mixing action, in the presence of caustic alkali and etherifying agent, a mass of comminuted cellulose having a particle size capable of passing through a 40 mesh screen and the majority of which is finer than 100 mesh screen size, said milled cellulose having a bulk density of at least 5 pounds per cubic foot; such mechanical mixing action being in the form of a combined agitation and tumbling of the cellulose mass, whereby the individual, discrete particles of cellulose are wetted by the liquid caustic alkali and etherifying agent reactants.

WILLIAM F. WALDECK.

REFERENCES CITED

The following references are of record in the file of this patent:

UNITED STATES PATENTS

| Number | Name | Date |
|---|---|---|
| 1,960,551 | Richer | May 29, 1934 |
| 2,067,946 | Picton | Jan. 19, 1937 |
| 2,131,733 | Haskins et al. | Oct. 4, 1933 |
| 2,278,612 | Collings et al. | Apr. 7, 1942 |
| 2,313,866 | Finlayson | Mar. 16, 1943 |
| 2,332,048 | Bock et al. | Oct. 19, 1943 |